April 14, 1936.  F. J. LEIFHEIT ET AL  2,037,245
FLUID SEPARATOR
Filed Nov. 7, 1934
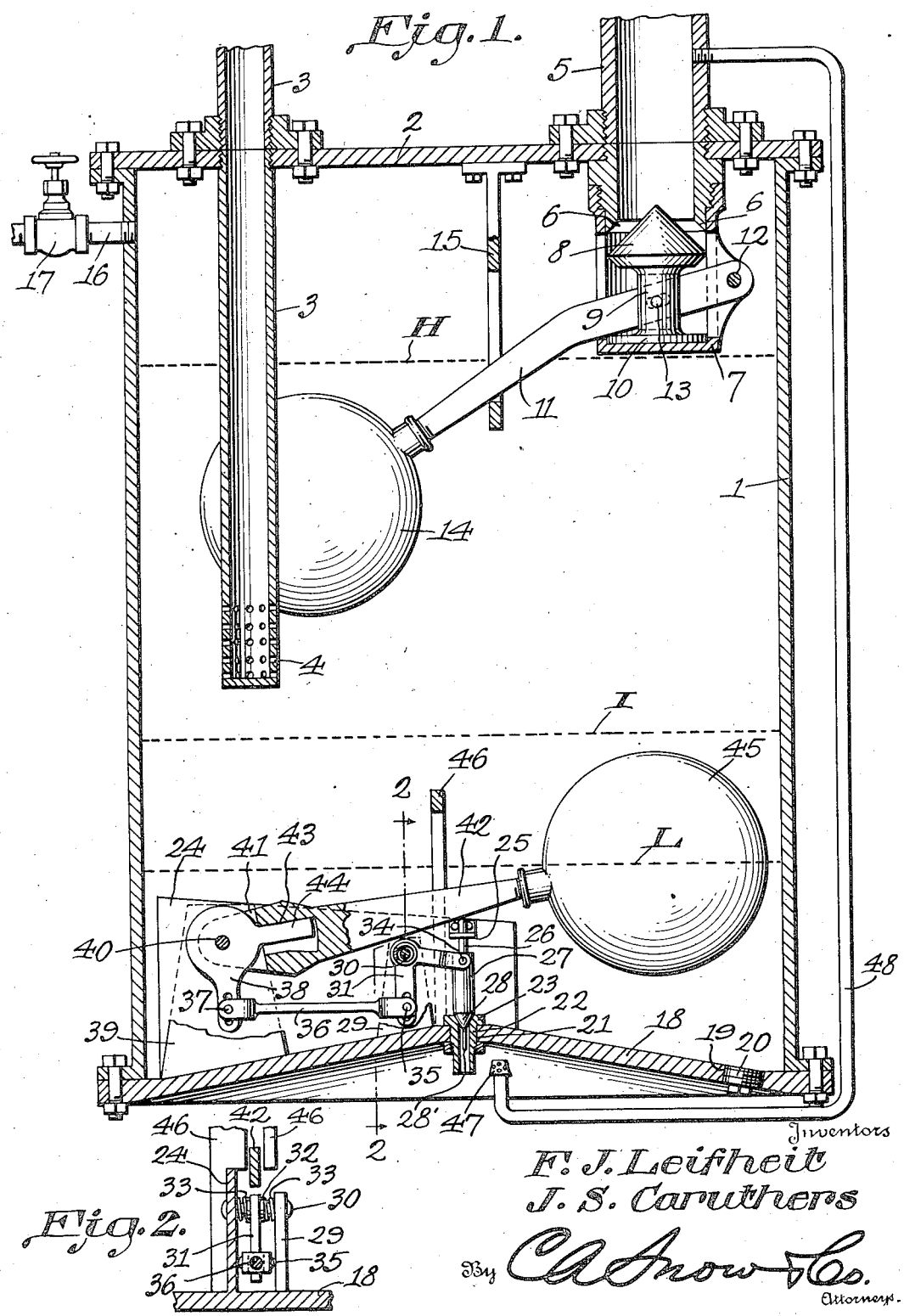
Inventors
F. J. Leifheit
J. S. Caruthers
By A. Snow & Co.
Attorneys.

Patented Apr. 14, 1936

2,037,245

UNITED STATES PATENT OFFICE 2,037,245

FLUID SEPARATOR

Frank J. Leifheit and Jacob S. Caruthers, Middleport, Ohio

Application November 7, 1934, Serial No. 751,908

3 Claims. (Cl. 137—103)

This invention relates to means for separating fluids such as oil, gas, water, steam, etc. It is designed for use in connection with wells, gas mains, compressed air lines, and the like where it is necessary, from time to time, to drain accumulated liquids so as to prevent interference with the flow of lighter fluids such as air, gas or vapor, the construction of the separator being such as to allow the liquid to be drained off after it has reached a predetermined level in a trap provided therefor, the withdrawal of the liquid being effected without loss of any of the gas or lighter fluid contents within the trap.

A still further object is to provide the trap with a supplemental means for closing the outlet provided for the lighter fluids if the liquid outlet should fail to open automatically from any cause.

Another object is to provide a separator of this type in which the liquid release valve will not open until the liquid reaches a predetermined level but will close before the liquid is entirely drained, thereby to maintain a liquid seal to prevent the escape of gas or the like.

Another object is to provide the trap with a baffle means for preventing the liquid from swirling while being discharged and thereby interfering with the proper actuation of the liquid controlling valve.

A further object is to provide a separator the parts of which can be assembled readily, easily adjusted, and will withstand the action of any substances to which it may be subjected.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing,

Figure 1 is a vertical section through a separator embodying the present improvements.

Figure 2 is a section on line 2—2, Figure 1.

Referring to the figures by characters of reference, 1 designates a trap or casing which can be of any suitable material and of any desired size or shape to meet the conditions under which it is to be used. The top of this trap is preferably closed by a head 2 bolted or otherwise attached thereto to form a sealed joint and coupled to this head in any suitable manner is a feed pipe 3 extending downwardly into the casing for supplying to said casing the gas, oil, water or other fluids to be separated. The bottom of this pipe is preferably closed while adjacent to the closed end are a number of radial outlet openings 4 forming a screen.

An outlet pipe 5 for conducting gas or other light fluid from the casing is joined to the head 2 in any suitable manner and located at the lower end of this pipe is a valve seat 6 from which extends a cage 7 in which is mounted a valve 8 having a stem 9 the enlarged base 10 of which is normally seated on the bottom of the cage as shown, thereby to support the valve 8 away from its seat 6.

A lever 11 is pivotally connected to the cage as shown at 12 and has a pivoted and sliding connection with the valve stem 9 as indicated at 13. The free end of this lever is provided with a float 14 and for the purpose of guiding the lever during its upward and downward swinging movement, there is provided a slotted hanger 15 which can depend from head 2 and has the lever extending through its slot as shown. Normally the float 14 is positioned below the extreme high level H of liquid trapped within casing 1.

An outlet pipe 16 extends from the upper portion of the casing and has a test valve 17 connected thereto.

The lower end of casing 1 is preferably closed by a conical head or base 18 having a drain opening 19 near its periphery which is normally closed by a screw plug 20 or the like. At the apex of the head 18 there is an outlet opening 21 in which is seated a bushing 22 providing a valve seat 23.

A baffle plate 24 is mounted on the head or base 18 and extends past the center thereof from a point adjacent to the wall of casing 1. This baffle is located adjacent to the seat 23 and carries a guide bracket 25 in which is slidably mounted the stem 26 of a valve 27. This valve has a tapered lower end 28 which normally engages the seat 23, thereby closing the outlet. A guide finger 28' depends from the valve.

Mounted on the base or head 18 adjacent to the outlet is a bracket 29 and this bracket is joined to the baffle 24 by a bearing pin 30. A bell crank lever 31 is fulcrumed on this pin and is interposed between friction washers 32. Springs 33 are interposed between these washers and plate 24 and bracket 29 respectively, the friction between the parts being such as to hold the bell crank lever in either extreme position to which it may be moved unless forcibly shifted by means provided for that purpose.

One arm of the bell crank lever 31 is pivotally connected to the valve 27 as shown at 34 while the other arm, which extends downwardly toward the head or base 18 is adjustably connected at 35 to a link 36. The other end of this link is adjustably connected at 37 to one arm of a bell crank lever 38 which is fulcrumed between a bracket 39 and the baffle 24.

The pin 40 on which this bell crank lever 38 is mounted, provides a bearing for the forked end 41 of a lever 42 and extending into this lever from its forked end is a recess 43 into which the other or upper arm 44 of the bell crank lever 38 extends. The recess is of such size as to permit a limited swinging movement of lever 42 independently of arm 44, this being apparent by referring to Figure 1.

Arm 42 extends over the stem 26 and to its free end is connected a float 45.

For the purpose of guiding lever 42 a slotted standard 46 is extended upwardly from the base or head 18, the said lever being mounted for up and down movement within the slots in this standard.

For the purpose of preventing the liquid contents of the casing or trap 1 from freezing during cold weather, a burner 47 can be located beneath the head or base 18 and fuel can be supplied to this burner from any suitable source through a pipe 48. If the fluid escaping through pipe 5 is of a combustible nature pipe 48 might be tapped into said pipe 5 as shown so that a portion of the escaping combustible fluid could thus be supplied to the burner.

Normally valve 27 is closed as shown and it will remain thus closed after the liquid contents of casing 1 reach the low liquid level indicated at L.

Fluids admitted to the casing 1 through pipe 3 will obviously separate within the casing, the liquid portions gravitating to the bottom of the casing while the gaseous or vapor portions will escape past the open valve 8 into pipe 5.

It is designed to have the valve 27 open automatically after a predetermined amount of liquid has been trapped in the casing 1. For example should the liquid level reach an intermediate point as indicated at I, the float 45 will have been lifted a sufficient distance to move arm 42 upwardly and bring the lower wall of recess 43 against arm 44 and raise the arm. This actuation of bell crank lever 38 will result in a thrust through link 36 against the depending arm of bell crank lever 38, causing the upper arm of said bell crank lever to move against the resistance offered by the friction elements 32 and to lift the valve 27 from its seat. The valve will be held open because its weight and that of the operating parts positively connected thereto is insufficient to overcome the frictional resistance of the elements 32.

As soon as the valve is opened the trapped liquid will begin to flow through the outlet in the base or head 18 and as the level of the liquid is gradually lowered from I toward L the float 45 and arm 42 will move downwardly independently of arm 42 until ultimately the top wall of recess 43 comes against arm 44 and thrusts it downwardly. The weight of lever 42 and float 45 will be sufficient to overcome the resistance offered by the friction elements 32 and, consequently, the valve 27 will be thrust forcibly upon its seat and shut off further escape of the trapped liquid. This action will occur when the level of the liquid reaches approximately the point L. Thus a sufficient amount of liquid will be retained at all times within the casing to act as a water seal to prevent escape of the lighter fluids through the bottom outlet with the liquid.

Should any of the connections between bell crank lever 38 and valve 27 become separated or broken, the descending lever 42 would strike against the raised upper end of stem 26 and force the valve downwardly to its seat.

Should the valve 27 fail to lift and release the trapped liquid at the proper time, thereby causing the level of the liquid to rise for example to the point H, said liquid, as it rises, would come against float 14 and elevate it, thereby causing level 11 to force valve 8 against its seat 6 and prevent the liquid from entering the pipe 5.

Obviously the structure herein described will constitute an efficient automatic water drip for gas wells, it operating to automatically drain the water when necessary to prevent it from entering the main gas line. It is also useful for draining trapped water at low points in gas mains, in compressed air lines, etc. It is especially advantageous because it maintains a constant water seal whereby escape of the gas with the draining liquid is prevented.

What is claimed is:

1. In apparatus of the class described the combination with a casing having an opening in the bottom thereof providing a valve seat, of an upstanding baffle plate on the bottom of the casing and extending past one side of the opening, said plate terminating adjacent to the wall and to the center of the casing, a slidable valve normally engaging the seat, a guide therefor, a bell crank supported by the baffle and connected to the valve, a second bell crank supported by the baffle, a link connecting the bell cranks for transmitting motion therebetween, a float controlled lever supported for swinging movement by the baffle, a lost motion connection between said lever and one arm of the second bell crank, and means on the valve providing a seat for the lever when the valve is closed and the lever is in its lowermost position.

2. In apparatus of the class described a casing having a baffle extending from a point adjacent its center, there being an opening in the bottom of the casing close to and at one side of the baffle providing a valve seat, a valve slidably mounted on the baffle and normally engaging the seat, a float carrying lever mounted for up and down swinging movement on the baffle, means on the valve providing a stop for the lever when the valve is on its seat, valve lifting mechanism, and a lost motion connection between said mechanism and the lever.

3. In apparatus of the class described a casing having a baffle extending from a point adjacent its center, there being an opening in the bottom of the casing close to and at one side of the baffle providing a valve seat, a valve slidably mounted on the baffle and normally engaging the seat, a float carrying lever mounted for up and down swinging movement on the baffle, means on the valve providing a stop for the lever when the valve is on its seat, valve lifting mechanism comprising a bell crank lever carried by the baffle and having one arm connected to the valve, a second bell crank lever, a link connection between the two bell crank levers, and a socket in the lever into which one arm of the second bell crank lever projects, said socket and arm being proportioned to provide a lost motion connection between lever and arm.

FRANK J. LEIFHEIT.
JACOB S. CARUTHERS.